United States Patent
Mead et al.

(10) Patent No.: US 8,057,309 B1
(45) Date of Patent: Nov. 15, 2011

(54) VERSATILE TOY CAPABLE OF ACTIVATING ELECTRONICS AND LAUNCHING COMPONENTS THEREOF

(75) Inventors: Raymond Aaron Mead, Pawtucket, RI (US); Robert L. Brown, North Kingstown, RI (US); Brian C. Jablonski, Providence, RI (US); Douglas C. Weiler, Bridgewater, MA (US)

(73) Assignee: Hasbro, Inc., Pawtucket, RI (US)

( * ) Notice: Subject to any disclaimer, the term of this patent is extended or adjusted under 35 U.S.C. 154(b) by 468 days.

(21) Appl. No.: 12/338,910

(22) Filed: Dec. 18, 2008

(51) Int. Cl.
*A63F 9/24* (2006.01)
*A63F 9/00* (2006.01)
*A63F 13/02* (2006.01)

(52) U.S. Cl. ......... 463/48; 463/47; 273/148 B; 446/404; 446/473

(58) Field of Classification Search ................ D14/418, D14/428; 124/1, 6, 78; 446/168, 473, 47; 463/47, 48; 273/148 R, 148 B
See application file for complete search history.

(56) References Cited

U.S. PATENT DOCUMENTS

| | | | |
|---|---|---|---|
| 5,253,068 A | 10/1993 | Crook et al. | |
| 5,401,025 A | 3/1995 | Smith, III et al. | |
| D374,041 S | 9/1996 | Oikawa | |
| 5,711,285 A * | 1/1998 | Stewart et al. | 124/67 |
| 5,885,129 A * | 3/1999 | Norris | 446/405 |
| 5,904,621 A | 5/1999 | Small et al. | |
| 6,328,650 B1 * | 12/2001 | Fukawa et al. | 463/36 |
| 6,569,019 B2 * | 5/2003 | Cochran | 463/37 |
| 6,672,962 B1 * | 1/2004 | Ozaki et al. | 463/37 |
| 6,902,483 B2 | 6/2005 | Lin | |
| 7,108,756 B2 * | 9/2006 | Lippmann et al. | 148/223 |
| RE39,409 E | 11/2006 | Sternberg et al. | |
| D614,624 S * | 4/2010 | Zhang | D14/418 |
| 7,731,061 B1 * | 6/2010 | Woodhouse et al. | 222/175 |
| 2004/0087241 A1 * | 5/2004 | Agostini et al. | 446/36 |
| 2004/0259644 A1 * | 12/2004 | McCauley | 463/51 |
| 2008/0070686 A1 * | 3/2008 | Satsukawa et al. | 463/37 |
| 2008/0171596 A1 | 7/2008 | Hsu | |

FOREIGN PATENT DOCUMENTS

JP 2001293261 A2 10/2001

* cited by examiner

*Primary Examiner* — Dmitry Suhol
*Assistant Examiner* — Alex F. R. P. Rada, II
(74) *Attorney, Agent, or Firm* — Perry Hoffman (57) ABSTRACT

A toy capable of interchangeably activating an electronic controller and a projectile launching component through the same trigger mechanism providing for a fun and interesting toy with a variety of play modes. A holder assembly including a receiving compartment is capable of accepting the electronic controller and the projectile launching component. The electronic controller includes at least one human user interface input button for controlling an electronic game, and the projectile launching component includes a mechanical actuator for launching a projectile. The trigger mechanism is in mechanical communication with the holder assembly for engagement with the human user interface input button for controlling the electronic game and the mechanical actuator for launching the projectile.

20 Claims, 8 Drawing Sheets

FIG. 6A

VERSATILE TOY CAPABLE OF ACTIVATING ELECTRONICS AND LAUNCHING COMPONENTS THEREOF

BACKGROUND OF THE INVENTION

1. Field of the Invention

The present invention relates to toys and more particularly to a toy capable of interchangeably activating an electronic controller and a projectile launching component through the same trigger element providing for a fun and interesting toy with a variety of play modes. The invention also relates to methods for interchangeably activating electronic and launching components through the versatile trigger element of the present invention.

2. Background of the Invention

Many kinds of shooting toys exist and are designed for the amusement of children and adults alike. Shooting toys come in various shapes with some of the most common toys shaped like guns of all sizes. Many of the known guns are shown to include a variety of projectiles for launching at a variety of stationary or moving targets. Alternatively, electronic toys and computer games are known to embody electronic controllers utilizing radio frequency, lasers and infrared light communications, etc. to simulate projectile shooting at stationary and moving targets.

Various known shooting devices exist and include configurations which squirt water from reservoirs and discharge numerous projectiles from multiple chambers. Water guns in the shape of hand guns, rifles, machine guns, and other configurations have been the most common type of toy utilizing water as a projectile.

These configurations can be simple hand-held squirt guns that use trigger-activated pumps to eject water, or more complicated and sophisticated shooters that rely upon pressurized tanks to shoot a stream of water a significant distance.

Other known projectile discharge devices include held or worn devices which are capable of shooting numerous projectiles. Some of these devices are shaped like guns employing a variety of discharge ports and a distribution mechanism to conduct the pressurized gas or liquid to the discharge ports in order to eject solid projectiles, liquid, or gas. Other known devices include a wearable toy employing a plurality of chambers capable of receiving numerous projectiles which are deployed by pulling each one of the multiple triggers linked to each one of the plurality of chambers, or by employing a mechanism with the triggering action capable of projecting a discharge element from a plurality of rotating pods to launch a variety of projectiles with the activation of a single lever.

Electronic gaming devices have been shown to integrate optical guns within a computer game scenario, and also enclose an electronic controller with attached transmitter and receiver of infrared light signals within a gun body. One of the most popular electronic controllers on the market is the Wii Remote® which is known to allow a user to interact with and manipulate items on screen via movements and pointing through use of accelerometer and optical sensor technology. It is also known to couple the Wii Remote® to attachments.

Significantly, known shooting toys and known electronic toys and computer games which simulate shooting do not include a versatile trigger mechanism which is operable to interchangeably actuate two different actuating mechanisms. It would be desirable to provide a toy with the triggering action capable of interchangeably activating an electronic controller and a projectile launching component.

SUMMARY OF THE INVENTION

The present invention addresses shortcomings of the prior art to provide a versatile toy capable of interchangeably activating an electronic controller and a projectile launching component through the same trigger element providing for a fun and interesting toy with a variety of play modes. The trigger element is in mechanical communication with a linkage assembly and is operable to engage a human user interface input button of the electronic controller for controlling an electronic game and a mechanical actuator of the projectile launching component to launch projectiles.

In one embodiment of the invention, the toy includes an electronic controller including at least one human user interface input button for controlling an electronic game, a projectile launching component including a mechanical actuator for launching a projectile and a holder assembly including a receiving compartment capable of accepting the electronic controller and the projectile launching component. A trigger element in mechanical communication with the holder assembly is also included and in mechanical communication with a linkage assembly for engagement with the human user interface input button for controlling the electronic game and the mechanical actuator for launching the projectile.

In another embodiment of the invention, the linkage assembly further includes a first actuating mechanism for engagement with the human user interface input button and a second actuating mechanism for engagement with the mechanical actuator. In another embodiment, the trigger element is operable to actuate two different actuating mechanisms, and in another embodiment, the trigger element is spring biased.

In still another embodiment, the first actuating mechanism includes a first protuberance projecting from an elongated member coupled to the trigger element and the second actuating mechanism includes a second protuberance projecting from the elongated member. In another embodiment, the first actuating mechanism further includes a pivoting button coupled to the holder assembly and in mechanical communication with the first protuberance for engagement with the human user interface input button.

In yet another embodiment, the electronic controller is a wireless handheld device which is separately operable when removed from the toy, and in another embodiment, the electronic controller includes accelerometers and infrared detection technology to detect movement of the controller by a game console in three dimensions enhancing game play for a user. In another embodiment, a pivoting lock assembly in mechanical communication with the holder assembly in further included and operable to retain the electronic controller in the receiving compartment when the lock assembly is in a locked position and release the electronic controller from the receiving compartment when the lock assembly is pivoted to an unlocked position. In still yet another embodiment, the projectile launching component further includes a spring driven piston operable for launching the projectile.

In another embodiment of the invention, the toy includes an electronic controller including at least one human user interface input button for controlling an electronic game, a projectile launching component including a mechanical actuator for launching a projectile, a holder assembly including a receiving compartment capable of accepting the electronic controller and the projectile launching component, and a trigger mechanism including a trigger element and a linkage assembly in mechanical communication with the holder assembly. The linkage assembly includes a first actuating mechanism for engagement with the human user interface input button and a second actuating mechanism for engagement with the mechanical actuator. The trigger mechanism is operable to actuate first and second actuating mechanisms for controlling the electronic game and launching the projectile.

In another embodiment, the first actuating mechanism includes a first protuberance projecting from an elongated member coupled to the trigger element and the second actuating mechanism includes a second protuberance projecting from the elongated member, and in another embodiment the first actuating mechanism further includes a pivoting button coupled to the holder assembly and in mechanical communication with the first protuberance for engagement with the human user interface input button. In still yet another embodiment, the projectile launching component further includes a spring driven piston operable for launching the projectile.

In another embodiment of the invention, a method for interchangeably activating an electronic controller and a projectile launching component includes providing a holder assembly including a trigger element and a receiving compartment, providing an electronic controller including at least one human user interface input button for controlling an electronic game and a projectile launching component including a mechanical actuator for launching a projectile and alternately inserting the electronic controller and the projectile launching component into the receiving compartment. Further providing a linkage assembly coupled to the holder assembly and operable to mechanically communicate with the trigger element and activating the trigger element to actuate the human user interface input button of the electronic controller to control an electronic game and the mechanical actuator of the projectile launching component to launch a projectile.

In another embodiment, the linkage assembly further provides a first actuating mechanism for engagement with the human user interface input button and a second actuating mechanism for engagement with the mechanical actuator, and in another embodiment, the trigger element is operable to actuate two different actuating mechanisms.

In still another embodiment of the invention, the first actuating mechanism further provides a first protuberance projecting from an elongated member coupled to the trigger element and the second actuating mechanism includes a second protuberance projecting from the elongated member, and in still yet another embodiment, the first actuating mechanism further provides a pivoting button coupled to the holder assembly and in mechanical communication with the first protuberance for engagement with the human user interface input button. In another embodiment, a pivoting lock assembly in mechanical communication with the holder assembly is further provided for retaining the electronic controller in the receiving compartment by pivoting the lock assembly to a locked position and releasing the electronic controller from the receiving compartment by pivoting the lock assembly to an unlocked position.

BRIEF DESCRIPTION OF THE DRAWINGS

For the purpose of facilitating an understanding of the inventions, the accompanying drawings and description illustrate a preferred embodiment thereof, from which the inventions, structure, construction and operation, and many related advantages may be readily understood and appreciated.

FIG. 3A is a perspective view of an embodiment of the toy of the present invention illustrating the projectile launching component received into the holder assembly, while

FIG. 4A illustrates a pivoting lock assembly in mechanical communication with the holder assembly in a locked position and also illustrates a first and second actuating mechanism, while

DESCRIPTION OF THE PREFERRED EMBODIMENT

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope of the present invention.

Figure 1:
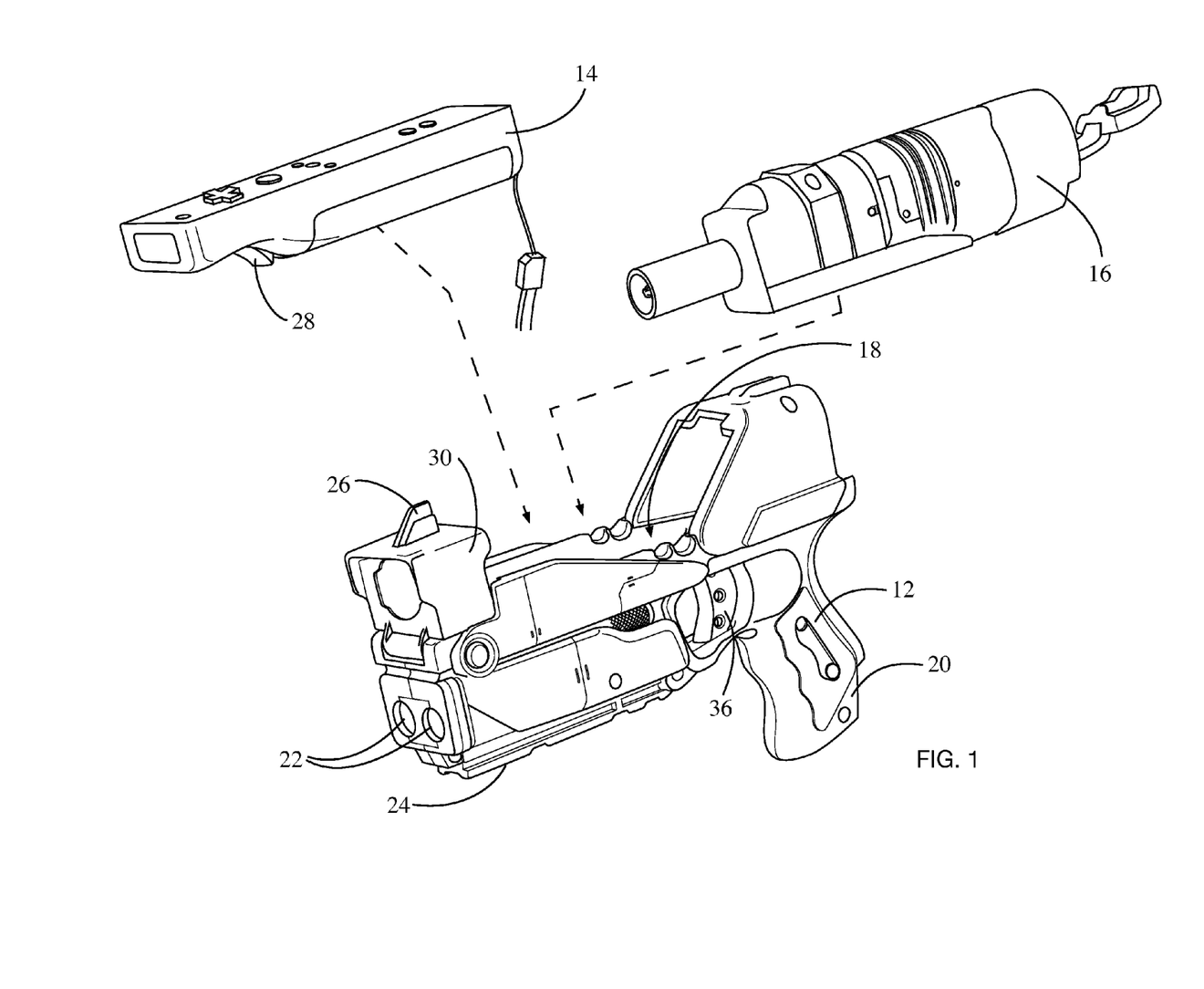
FIG. 1 is a perspective view of a toy of the present invention illustrating a holder assembly shown capable of interchangeably receiving an electronic controller and a projectile launcher.

A toy 10, as seen in FIG. 1, is generally shaped to look like a toy gun including a holder assembly 12 with interchangeable components allowing for varied game play. An electronic controller component 14 and a projectile launching component 16 can be interchangeably received into the holder assembly 12, as seen in FIG. 1. It is contemplated that the toy of the present invention can include a number of alternative holder shapes such as other weapons or sports accessories where it would be desirable to include interchangeable electronic controllers and launching components.

Figure 2:
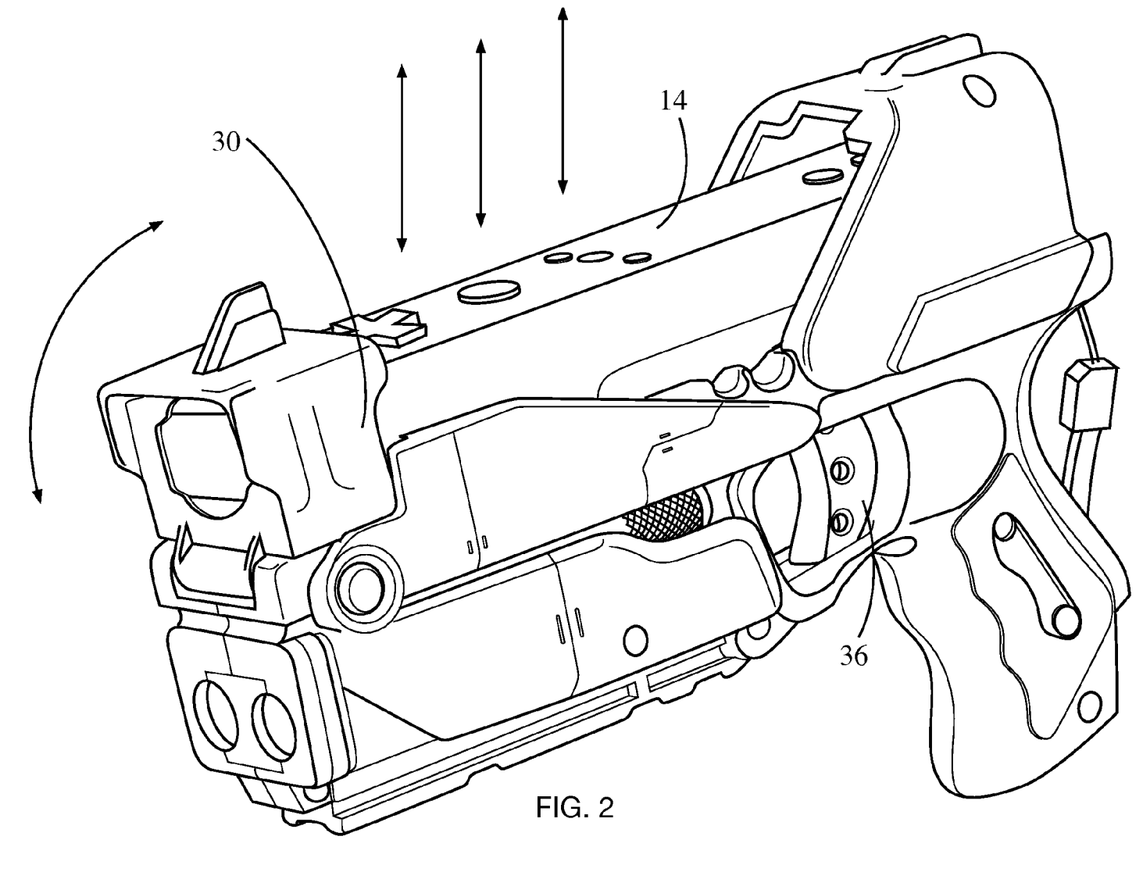
FIG. 2 is a perspective view of an embodiment of the toy of the present invention illustrating the electronic controller received into the holder assembly.
Figure 3A:
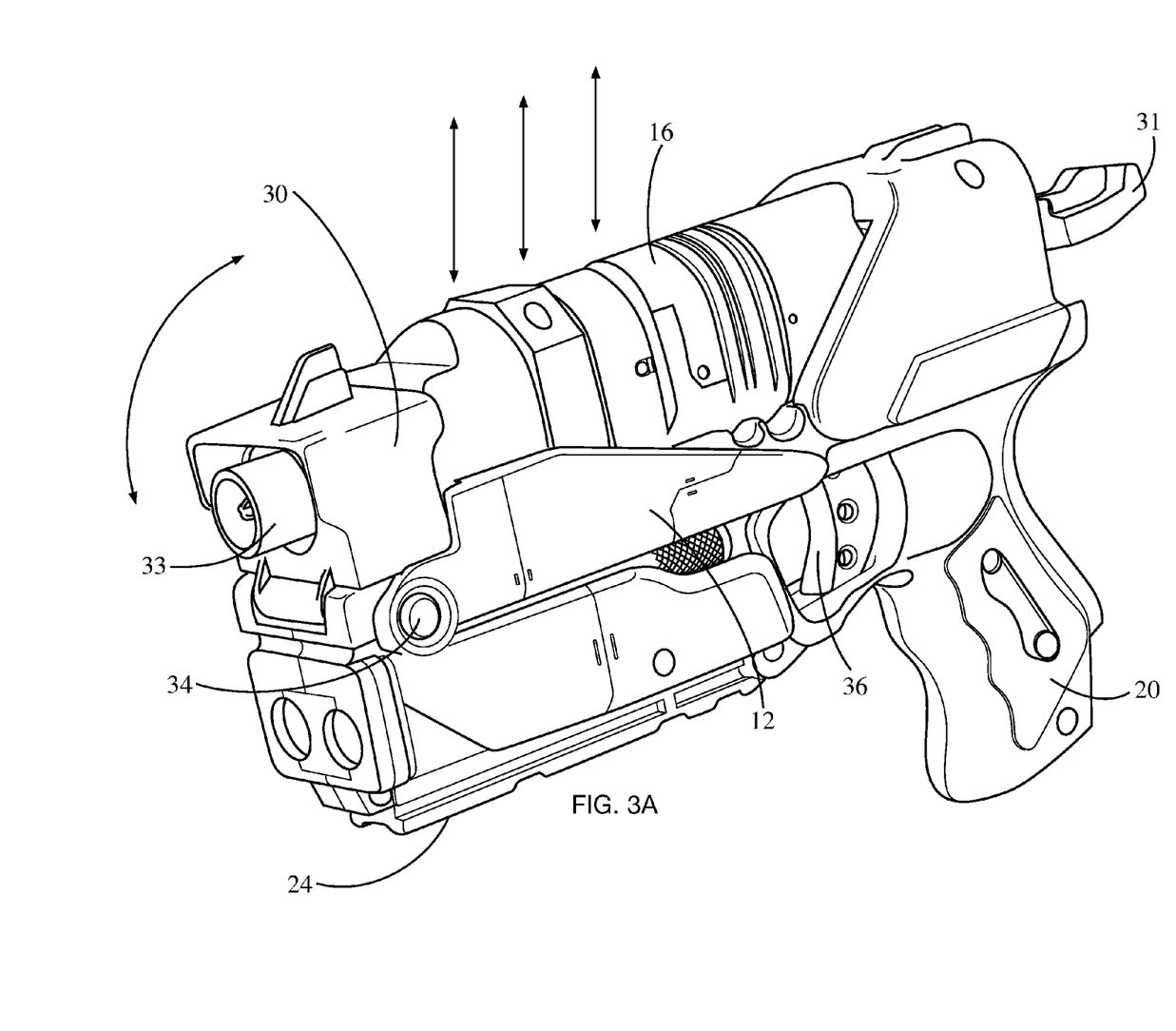

The holder assembly 12, includes a receiving compartment 18, as seen in FIG. 1, capable of accepting the electronic controller 14, as shown in FIG. 2, and the projectile launching component 16, as shown in FIG. 3A. A grip or handle 20 is also integral with or coupled to the holder assembly for ease of use by a user. In the present described embodiment, the holder assembly 12 includes dart storage compartments 22 for storing foam Nerf® darts, as well as other features which mimic a real gun such as a tactical rail system 24, and a sight 26. Additionally, in the present described embodiment, the holder assembly 12, is molded from a durable plastic material, however, it is also contemplated that the assembly 12 may include other suitable materials such as metal or wood, etc.

The electronic controller 14, as seen in FIG. 1, is generally a wireless handheld device operable for controlling an electronic or computer game. The electronic controller 14 includes at least one human user interface input button 28 for controlling the electronic game and the controller 14 can be separately operable when removed from the holder assembly. In the present described embodiment, the electronic controller 14 can connect wirelessly to a game console via Bluetooth™ technology. Additionally, the electronic controller 14 can include built in accelerometers and infrared detection technology which can detect movement of the controller by the game console in three dimensions enhancing game play for a user. In the present described embodiment, the electronic controller 14, as seen in FIG. 1 includes a standard Wii™ Remote which is capable of being received into the receiving compartment 18 and actuated by the toy 10 of the present invention.

Figure 3B:
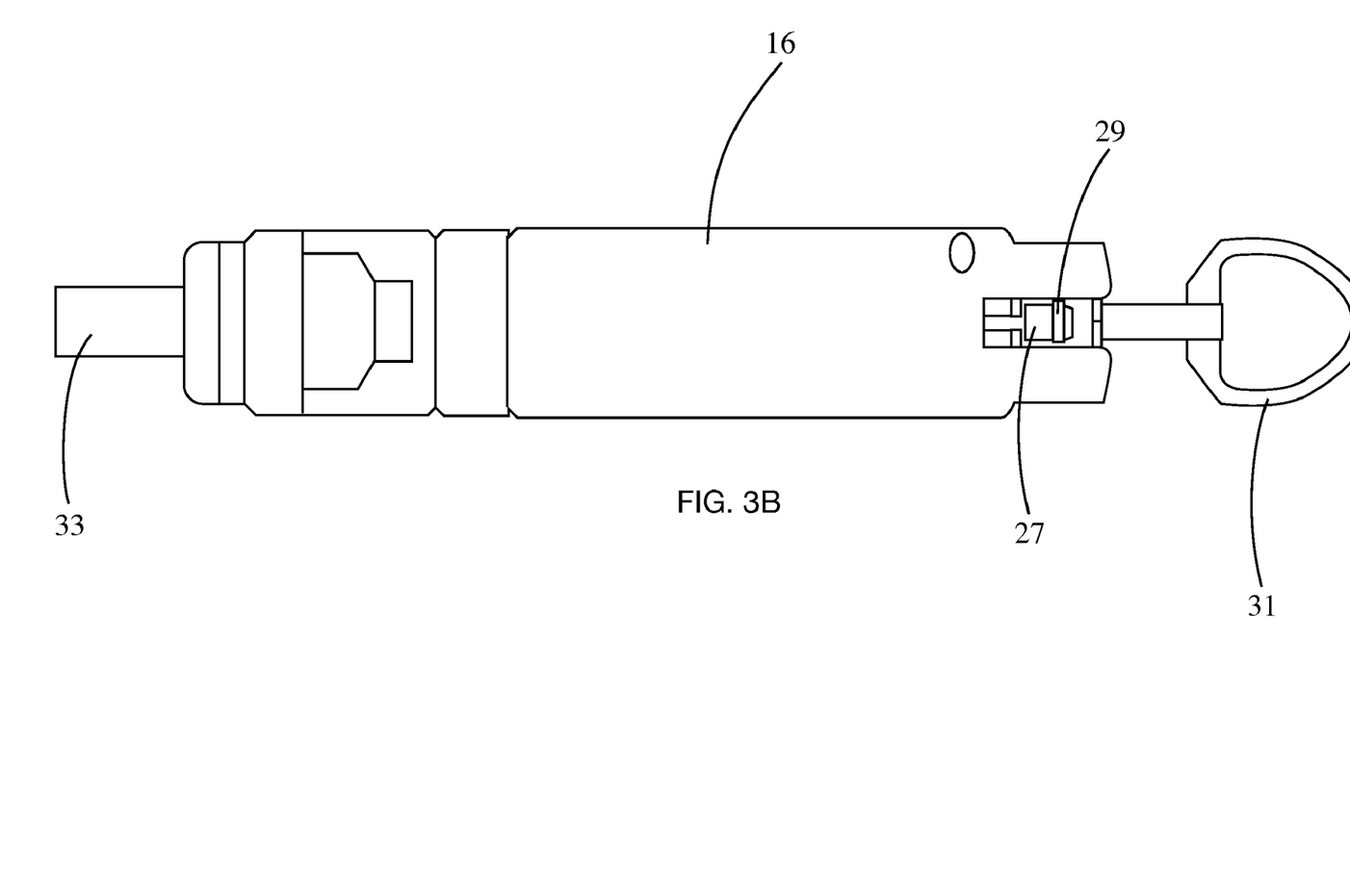
FIG. 3B illustrates a mechanical actuator of the projectile launching component.

The projectile launching component 16 is also easily received into the receiving portion 18 of the holder assembly 12, as seen in FIG. 3A. The projectile launching component 16 includes a mechanical actuator 27, as seen in FIG. 3B, and a spring driven or pneumatic piston operable for launching the projectile. In the present described embodiment, a lip element 29 projects from the mechanical actuator 27 for contact with a trigger mechanism 35 when the launching component 16 is received into the receiving compartment 18. The mechanical actuator 27 is spring biased to maintain the contact between the lip element 29 and the trigger mechanism 35, and also helps maintain contact between the piston and the spring driving the piston to allow for the charged piston to maintain it's readiness for launching the projectile.

The projectile launching component 16 further includes a charging element 31 and a projectile barrel 33 for retaining the projectile until launched. The charging element 31 is in mechanical communication with the spring driven or pneumatic piston and capable of charging or pressurizing the piston for launching the retained projectile from the barrel 33. In the present described embodiment, the projectile launching component 16 includes a Nerf® blaster with a handle charging element 31 for manually charging the spring driven piston and launching projectiles in the form of foam Nerf® darts with suction cup tips.

A pivoting lock assembly 30, as seen in FIGS. 1-4, is in mechanical communication with the holder assembly 12 and operable to interchangeably retain the electronic controller 14, as seen in FIG. 2, and the projectile launching component 16, as seen in FIG. 3A, in the receiving compartment 18. The pivoting lock assembly 30 includes at least one locking tab 32, as seen in FIGS. 4A & 4B, which locks onto at least one spring loaded protrusion 34 which is coupled to the holder assembly 12. In the present described embodiment, a spring loaded protrusion 34 projects from opposite sides of the receiving compartment 18 and locks into a locking tab 32 included on either side of the pivoting lock assembly 30 when the assembly is in a locked position, as seen in FIGS. 3A & 4A. A release button 21, coupled to the holder assembly, releases the protrusions 34 from contact with the locking tabs 32, allowing the lock assembly 30 to pivot to an unlocked position away from the holder assembly 12 and release the electronic controller 14 or the projectile launching component 16 from the receiving compartment 18, as seen in FIG. 4B.

Figure 4A:
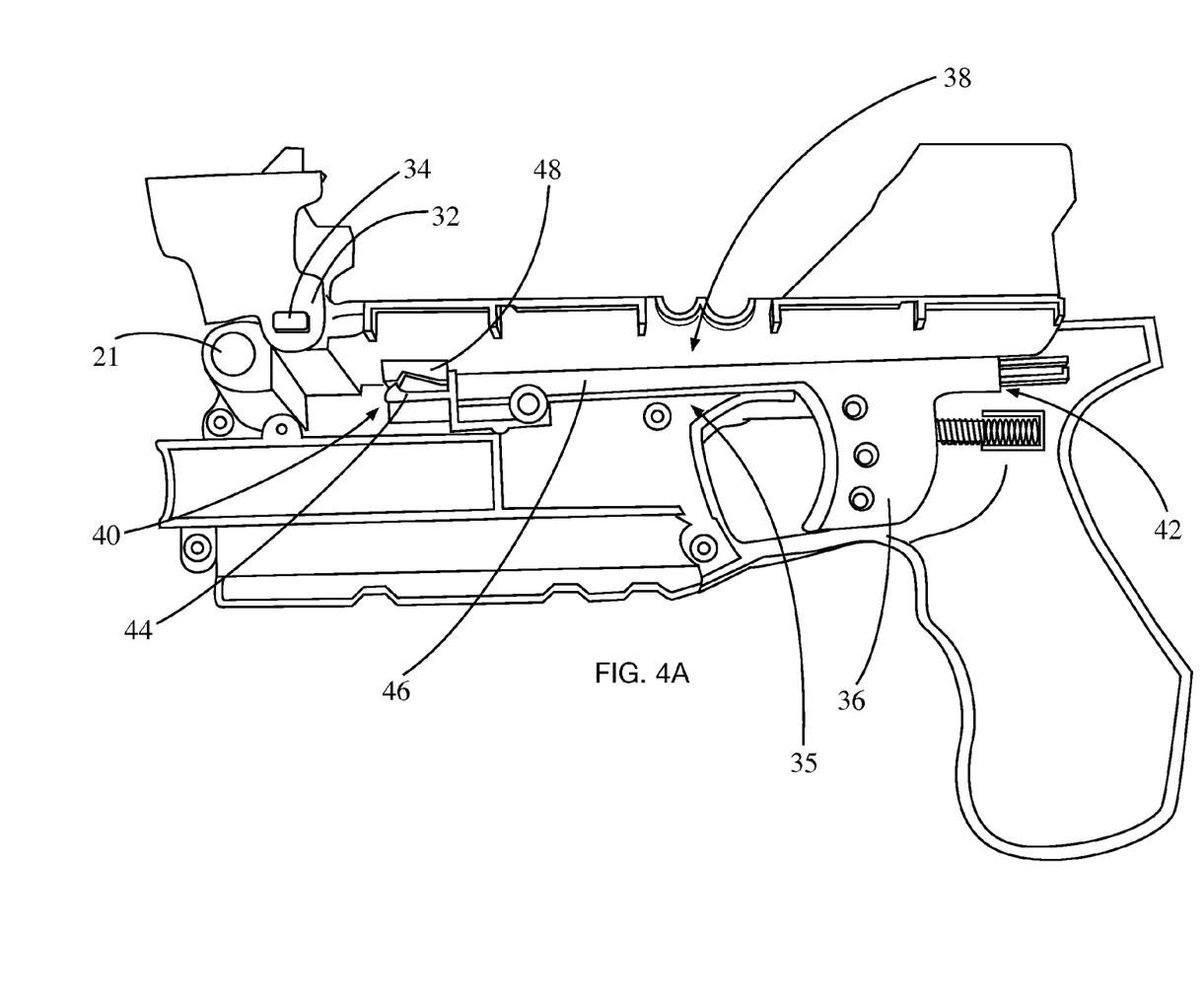
Figure 4B:
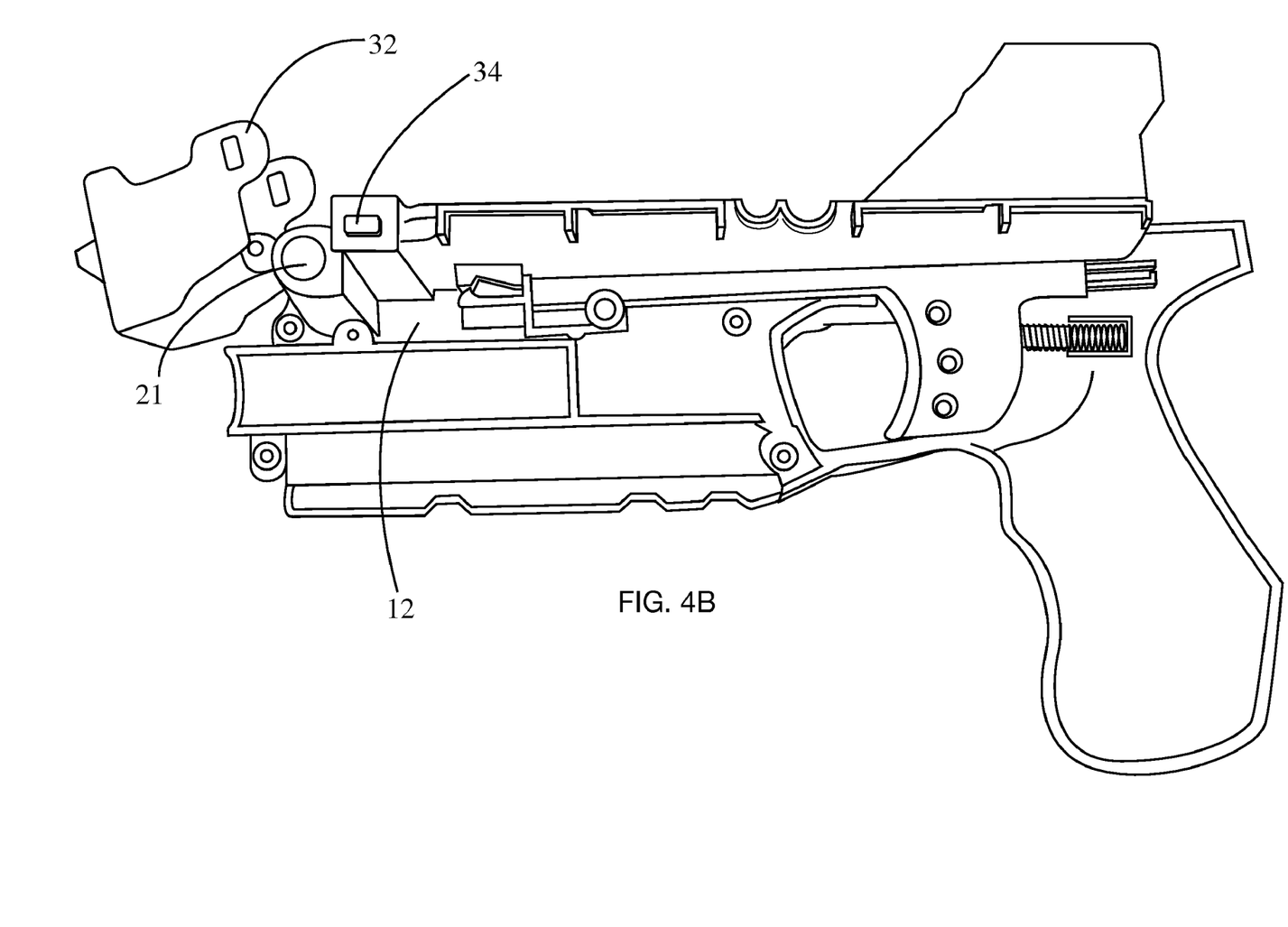
FIG. 4B illustrates the pivoting lock assembly in an unlocked position.
Figure 5:
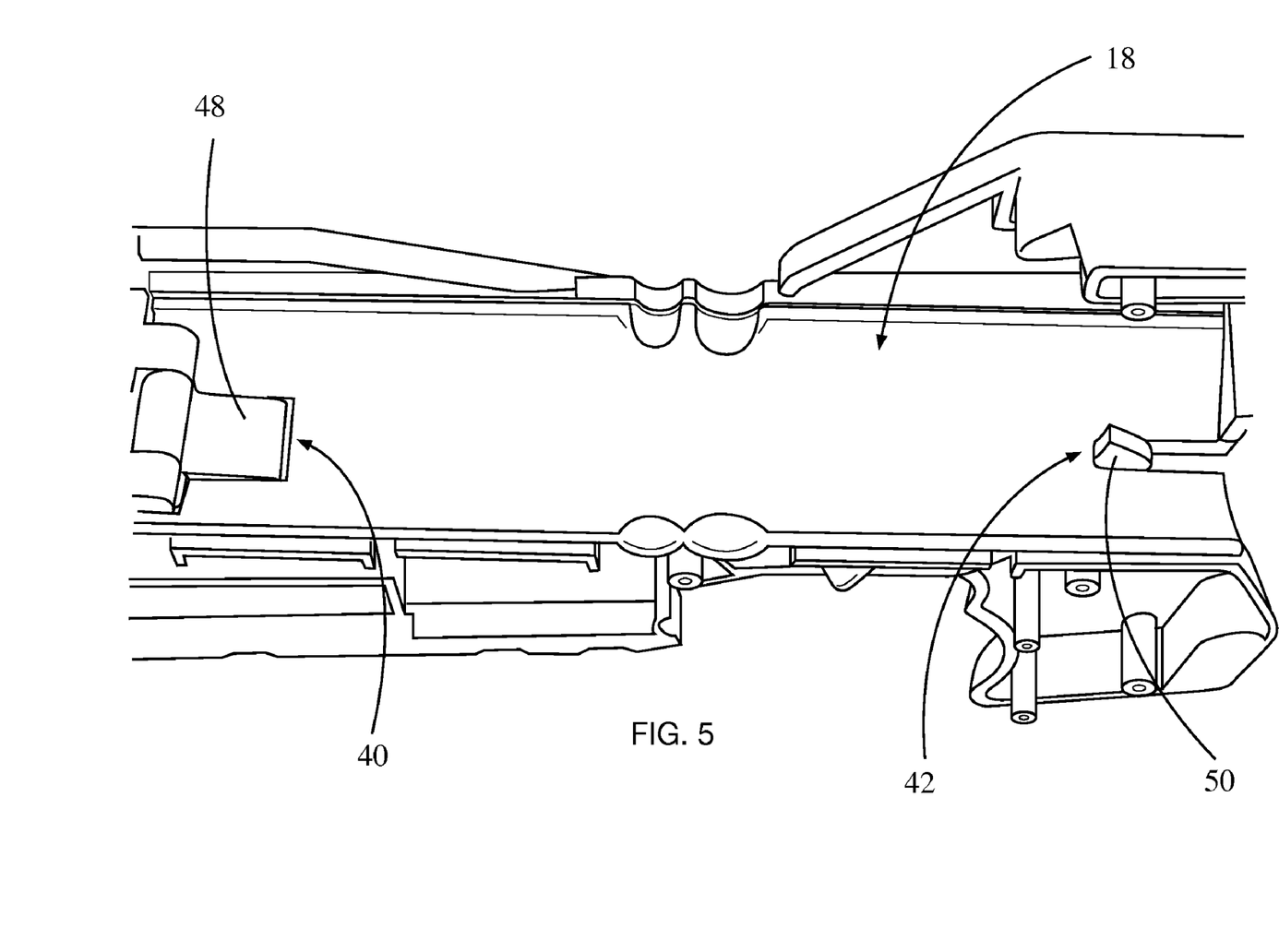
FIG. 5 is a perspective view of a receiving portion of the holder assembly further illustrating the first and second actuating mechanism.

The trigger mechanism 35, as mentioned above and best seen in FIGS. 4 & 5, is operable to provide a versatile triggering action capable of actuating different game components through a common trigger element 36 providing for a fun and interesting toy 10 with a variety of play modes. The trigger mechanism 35 includes the trigger element 36 and a linkage assembly 38, as seen in FIGS. 4 & 5.

The trigger element 36 is in mechanical communication with the holder assembly 12 and is easily actuated by a user holding the grip 20 of the holder assembly. The linkage assembly 38, is in mechanical communication with the trigger element 36, and is operable for engagement with the human user interface input button 28 of the electronic controller 14 for controlling the electronic game, and the mechanical actuator 27 of the projectile launching component 16 for launching the projectile. The linkage assembly 38 includes a first actuating mechanism 40 for engagement with the human user interface input button 28 and a second actuating mechanism 42 for engagement with the mechanical actuator 27. The trigger mechanism 35 is operable to actuate first and second actuating mechanisms for controlling the electronic game and launching the projectile.

In the present described embodiment, the first actuating mechanism 40 includes a first protuberance 44 projecting from an elongated member 46 which is coupled to the trigger element 36. A pivoting button 48 is coupled to the holder assembly 12 and is in mechanical communication with the first protuberance 44 for engagement with the user interface input button 28, as seen in FIG. 4A. The second actuating mechanism 42 includes a second protuberance 50 projecting from the elongated member 46, as seen in FIG. 5 for engagement with the mechanical actuator 27.

In use, the electronic controller 14 is received into the receiving portion 18 positioning the user interface input button 28 into contact with the pivoting button 48. The pivoting lock assembly 30 is manually moved to the locked position to retain the controller 14 in position. Pulling the trigger element 36, when desired by the user, causes the elongated member 46 to pull the first protuberance 44 into contact with the pivoting button 48 which in turn depresses the user interface input button 28 activating the electronic controller 16. The user then can continue to control the electronic game by pulling the trigger element 36 as desired, or alternatively, the user can remove the electronic controller and insert the projectile launching component 16, if desired.

Figure 6A:
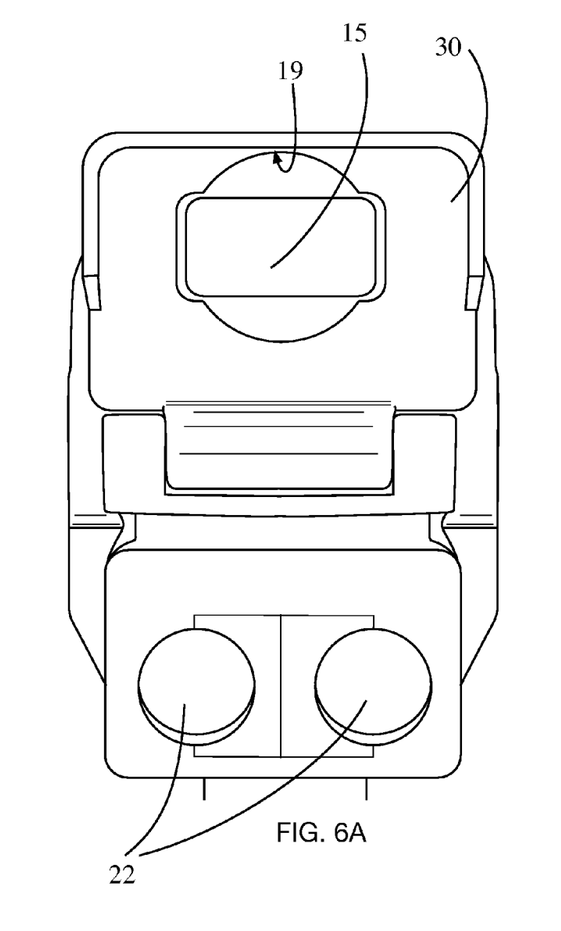
FIGS. 6A & 6B illustrate the electronic controller in use locked into the receiving portion of the holder assembly with FIG. 6A illustrating a front end of the controller and FIG. 6B illustrating a back end of the controller.
Figure 6B:
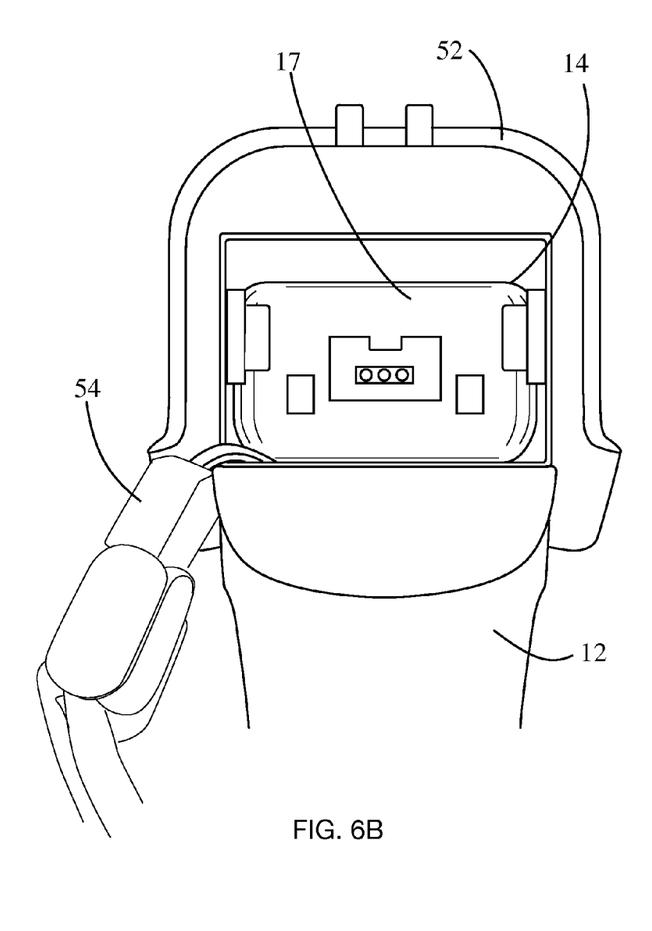

As seen in FIGS. 6A & 6B, the electronic controller in use is locked into the receiving portion of the holder assembly. Transmitting and receiving technology contained within a front portion 15 of the controller 14, as shown in FIG. 6A is exposed through a window 19 in the pivoting lock mechanism 30 allowing the game console to receive and transmit wireless communications to and from the controller locked into the receiving portion of the toy 10. Additionally, as seen in FIG. 6B, an arched bracket 52 coupled to the receiving portion 18 at the grip 20 end of the toy 10, helps retain a back portion 17 of the controller 14 in position in the receiving portion 18. The back portion 17 of the controller 14 is exposed allowing access to the controller 14 if other game accessories, desired by the user, need to be attached to the controller 14. Additionally, a safety strap 54 common to many electronic controllers 14, is easily accommodated through the arched bracket 52.

Interchanging the electronic controller 14 with the projectile launching component 16 is then accomplished by depressing the release button 21 and pivoting the lock assembly 30 to the unlocked position releasing the electronic controller 14 from the receiving compartment 18. Inserting the projectile launching component 16 into the receiving compartment 18 will position the lip element 29 of the manual actuator 27 into contact with the second protuberance 50. Pulling the charging element 31 from the spring driven or pneumatic piston, charges the piston for launching. Pulling the trigger element 36, when desired by the user, causes the elongated member 46 to pull the second protuberance 50 into contact with the lip element 29 launching the projectile. The user can continue to reload projectiles, charge the piston and launch the projectiles, or alternatively, remove the projectile launching component 16 and reinsert the electronic controller 14 into the receiving portion of the toy 10.

In use, the two different actuating mechanisms, the first actuating mechanism 40 and the second actuating mechanism 42, can be actuated by the same common trigger element 36, allowing the toy 10 of the present invention to interchangeably control the electronic game and launch projectiles with the same holder assembly providing for a variety of fast action play modes.

A method for interchangeably activating an electronic controller and a projectile launching component includes the steps of providing a holder assembly including a trigger element and a receiving compartment, providing an electronic controller including at least one human user interface input button for controlling an electronic game and a projectile launching component including a mechanical actuator for launching a projectile and further providing a linkage assembly coupled to the holder assembly and operable to mechanically communicate with the trigger element. Alternately inserting the electronic controller and the projectile launching component into the receiving compartment and activating the trigger element to actuate the human user interface input button of the electronic controller controls an electronic game and the mechanical actuator of the projectile launching component launches a projectile.

The linkage assembly further provides a first actuating mechanism for engagement with the human user interface input button and a second actuating mechanism for engagement with the mechanical actuator, and the trigger element is operable to actuate two different actuating mechanisms.

The first actuating mechanism further provides a first protuberance projecting from an elongated member coupled to the trigger element and the second actuating mechanism includes a second protuberance projecting from the elongated member. The first actuating mechanism further provides a pivoting button coupled to the holder assembly and in mechanical communication with the first protuberance for engagement with the human user interface input button. The method further includes the steps of providing a pivoting lock assembly in mechanical communication with the holder assembly and retaining the electronic controller in the receiving compartment by pivoting the lock assembly to a locked position and releasing the electronic controller from the receiving compartment by pivoting the lock assembly to an unlocked position.

From the foregoing, it can be seen that there has been provided a unique toy to with a versatile triggering action capable of actuating different game components through a common trigger element providing for a fun and interesting toy with a variety of play modes. While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A toy capable of interchangeably activating an electronic controller and a projectile launching component, comprising:
   an electronic controller including at least one human user interface input button for controlling an electronic game;
   a projectile launching component including a mechanical actuator for launching a projectile;
   a holder assembly including a receiving compartment for alternately inserting the electronic controller and the projectile launching component;
   a trigger element in mechanical communication with the holder assembly; and
   a linkage assembly in mechanical communication with the trigger element for engagement with the human user interface input button for controlling the electronic game and the mechanical actuator for launching the projectile.

2. The toy according to claim 1, wherein the linkage assembly further comprises a first actuating mechanism for engagement with the human user interface input button and a second actuating mechanism for engagement with the mechanical actuator.

3. The toy according to claim 1, wherein the trigger element is operable to actuate two different actuating mechanisms.

4. The toy according to claim 3, wherein the trigger element is spring biased.

5. The toy according to claim 2, wherein the first actuating mechanism includes a first protuberance projecting from an elongated member coupled to the trigger element and the second actuating mechanism includes a second protuberance projecting from the elongated member.

6. The toy according to claim 5, wherein the first actuating mechanism further comprises a pivoting button coupled to the holder assembly and in mechanical communication with the first protuberance for engagement with the human user interface input button.

7. The toy according to claim 1, wherein the electronic controller comprises a wireless handheld device which is separately operable when removed from the toy.

8. The toy according to claim 7, wherein the electronic controller includes accelerometers and infrared detection technology to detect movement of the controller by a game console in three dimensions enhancing game play for a user.

9. The toy according to claim 8, further comprising a pivoting lock assembly in mechanical communication with the holder assembly and operable to retain the electronic controller in the receiving compartment when the lock assembly is in a locked position and to release the electronic controller from the receiving compartment when the lock assembly is pivoted to an unlocked position.

10. The toy according to claim 1, wherein the projectile launching component further comprises a spring driven piston operable for launching the projectile.

11. A method for interchangeably activating an electronic controller and a projectile launching component, comprising the steps of:
   providing a holder assembly including a trigger element and a receiving compartment;
   providing an electronic controller including at least one human user interface input button for controlling an electronic game and a projectile launching component including a mechanical actuator for launching a projectile;
   alternately inserting the electronic controller and the projectile launching component into the receiving compartment;
   providing a linkage assembly coupled to the holder assembly and operable to mechanically communicate with the trigger element; and
   activating the trigger element to actuate the human user interface input button of the electronic controller for controlling an electronic game and the mechanical actuator of the projectile launching component for launching a projectile.

12. The method according to claim 11, wherein the linkage assembly further provides a first actuating mechanism for engagement with the human user interface input button and a second actuating mechanism for engagement with the mechanical actuator.

13. The method according to claim 11, wherein the trigger element is operable to actuate two different actuating mechanisms.

14. The method according to claim 12, wherein the first actuating mechanism further provides a first protuberance projecting from an elongated member coupled to the trigger element and the second actuating mechanism includes a second protuberance projecting from the elongated member.

15. The method according to claim 14, wherein the first actuating mechanism further provides a pivoting button coupled to the holder assembly and in mechanical communication with the first protuberance for engagement with the human user interface input button.

16. The method according to claim 11, further including the steps of providing a pivoting lock assembly in mechanical communication with the holder assembly and retaining the electronic controller in the receiving compartment by pivoting the lock assembly to a locked position and releasing the electronic controller from the receiving compartment by pivoting the lock assembly to an unlocked position.

17. A toy capable of interchangeably activating an electronic controller and a projectile launching component, comprising:

an electronic controller including at least one human user interface input button for controlling an electronic game;

a projectile launching component including a mechanical actuator for launching a projectile;

a holder assembly including a receiving compartment for alternately inserting the electronic controller and the projectile launching component;

a trigger mechanism including a trigger element and a linkage assembly in mechanical communication with the holder assembly, the linkage assembly including a first actuating mechanism for engagement with the human user interface input button and a second actuating mechanism for engagement with the mechanical actuator; and the trigger mechanism is operable to actuate first and second actuating mechanisms for controlling the electronic game and launching the projectile.

18. The toy according to claim 17, wherein the first actuating mechanism includes a first protuberance projecting from an elongated member coupled to the trigger element and the second actuating mechanism includes a second protuberance projecting from the elongated member.

19. The toy according to claim 18, wherein the first actuating mechanism further comprises a pivoting button coupled to the holder assembly and in mechanical communication with the first protuberance for engagement with the human user interface input button.

20. The toy according to claim 19, wherein the projectile launching component further includes a spring driven piston operable for launching the projectile.

* * * * *